United States Patent
Nakamura et al.

(10) Patent No.: US 6,813,167 B2
(45) Date of Patent: Nov. 2, 2004

(54) MULTIPLEX CONNECTION INVERTER APPARATUS

(75) Inventors: Masashi Nakamura, Saitama (JP);
Motohiro Shimizu, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 7 days.

(21) Appl. No.: 10/161,594

(22) Filed: Jun. 5, 2002

(65) Prior Publication Data

US 2003/0025398 A1 Feb. 6, 2003

(30) Foreign Application Priority Data

Aug. 2, 2001 (JP) ..................................... P2001-235384

(51) Int. Cl.[7] .............................................. H02M 1/12
(52) U.S. Cl. ........................... 363/40; 363/363; 363/71
(58) Field of Search ............................ 363/39–43, 65, 363/71

(56) References Cited

U.S. PATENT DOCUMENTS

| | | | | |
|---|---|---|---|---|
| 4,814,965 A | * | 3/1989 | Petersen ...................... | 363/65 |
| 5,016,158 A | * | 5/1991 | Matsui et al. ................. | 363/71 |
| 5,657,217 A | * | 8/1997 | Watanabe et al. ............. | 363/71 |
| 6,281,664 B1 | * | 8/2001 | Nakamura et al. ............ | 322/22 |
| 6,411,530 B2 | * | 6/2002 | Hammond et al. ........... | 363/41 |

FOREIGN PATENT DOCUMENTS

| | | |
|---|---|---|
| JP | 60-98875 | 6/1985 |
| JP | 6-78548 | 3/1994 |

* cited by examiner

*Primary Examiner*—Michael Sherry
*Assistant Examiner*—Gary L. Laxton
(74) *Attorney, Agent, or Firm*—Westerman, Hattori, Daniels & Adrian, LLP

(57) ABSTRACT

A multiplex connection inverter apparatus is provided having two separate inverters connected to each other for declining current ripples which may be generated when the superposing of the alternating current outputs with their carrier signal components held in phase with each other. The alternating current outputs of the two inverters are set opposite in the phase while their carrier signal components are in phase with each other. For connecting in parallel, the positive port of one of the two inverters is connected to the negative port of the other inverter to constitute one of two output terminals while the negative port of the one inverter is connected to the positive port of the other inverter to constitute the other output terminal. For connecting in series, the negative ports of the two inverters are connected to each other while the positive ports of the same are assigned as two output ports.

2 Claims, 5 Drawing Sheets

SERIES

PARALLEL

Fig. 6
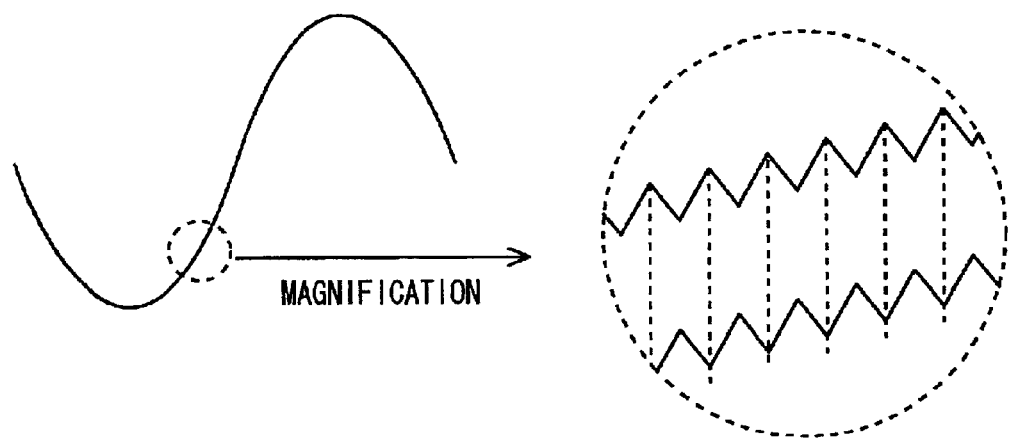
Fig. 6 (a)
Fig. 7
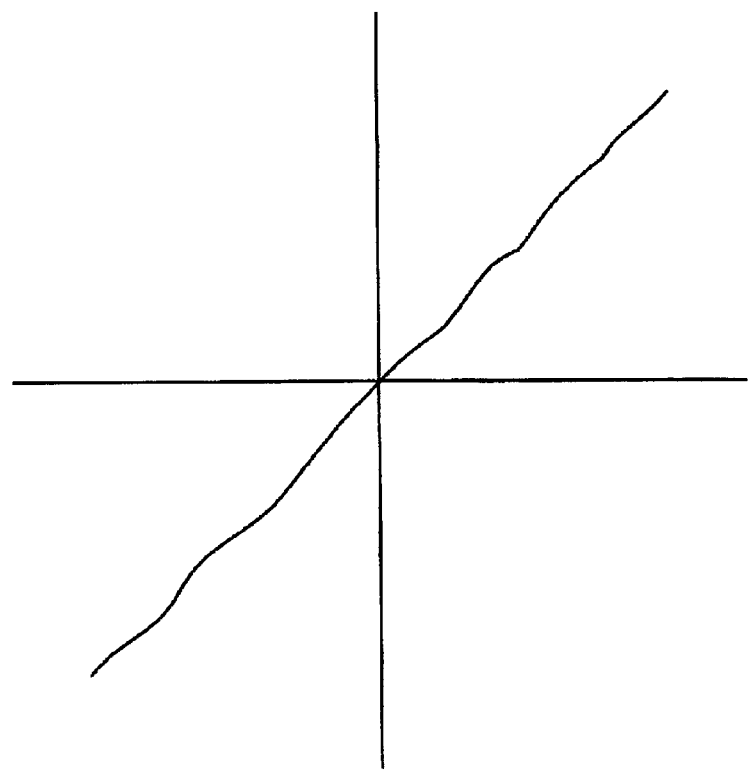

Fig. 8
PRIOR ART
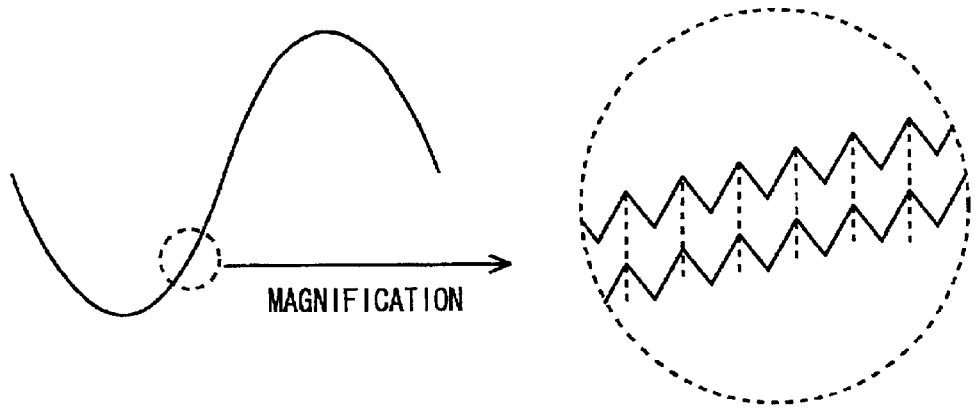
Fig. 8 (a)
PRIOR ART
Fig. 9
PRIOR ART
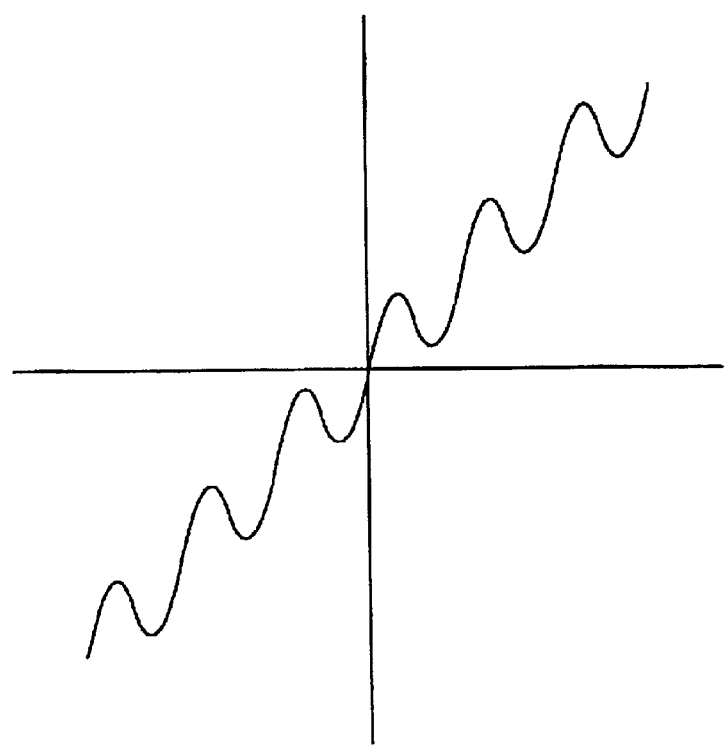

MULTIPLEX CONNECTION INVERTER APPARATUS

BACKGROUND OF THE INVENTION

1. Field of the Invention

The present invention relates to a multiplex connection inverter apparatus having a plurality of inverters connected for multiplexing and particularly to a multiplex connection inverter apparatus adapted for minimizing undesired current ripples generated when the alternative current outputs of inverters with carrier signal components of the alternating current outputs are superposed in phase with each other.

2. Description of the Related Art

A common PWM inverter apparatus comprises a converter unit for converting alternating current receiving from an alternating current generator or power source into direct current and an inverter unit for re-converting a direct current output of the converter unit into an alternating current output having a desired frequency. Such a PWM inverter apparatus is disclosed in Japanese Patent Laid-open Publication (Showa) 60-98875 which has a group of PWM inverters multiplex connected for producing high-power alternating current outputs at desired frequencies through PWM controlling the switching elements (e.g. power transistors) of the inverters with a PWM signal which consists of a waveform command such as a voltage or frequency control command and a carrier signal.

The alternating current output of each PWM inverter controlled by PWM signal contains a carrier signal component used for generation of the PWM signal, as shown in FIG. 8. If the alternating current outputs are simply superposed while their carrier signal components are in phase with each other, their carrier signal components can significantly be amplified as shown in FIG. 9. As a result, voltage ripples in the alternating current output will unfavorably be increased.

SUMMARY OF THE INVENTION

It is hence an object of the present invention to minimize current ripples generated when the alternating current outputs of inverters with carrier signal components of the alternating current outputs are superposed in phase with each other.

A multiplex connection inverter apparatus according to the present invention is provided which has a pair of inverters arranged for superposing their alternating current outputs. In particular, the alternating current outputs are superposed with their carrier signal components held opposite in the phase to each other.

According to the above advantage of the present invention, the alternating current outputs of the inverters are multiplexed while their carrier signal components are offset by each other, thus decreasing undesired current ripples.

BRIEF DESCRIPTION OF THE DRAWINGS

FIG. 6 is a diagram showing an offset action of two carrier signal components;

FIG. 7 is a diagram explaining the effect of the present invention;

FIG. 8 is a diagram showing a drawback of the prior art; and

FIG. 9 is a diagram showing the drawback of the prior art.

DETAILED DESCRIPTION OF THE PREFERRED EMBODIMENT

Figure 1:
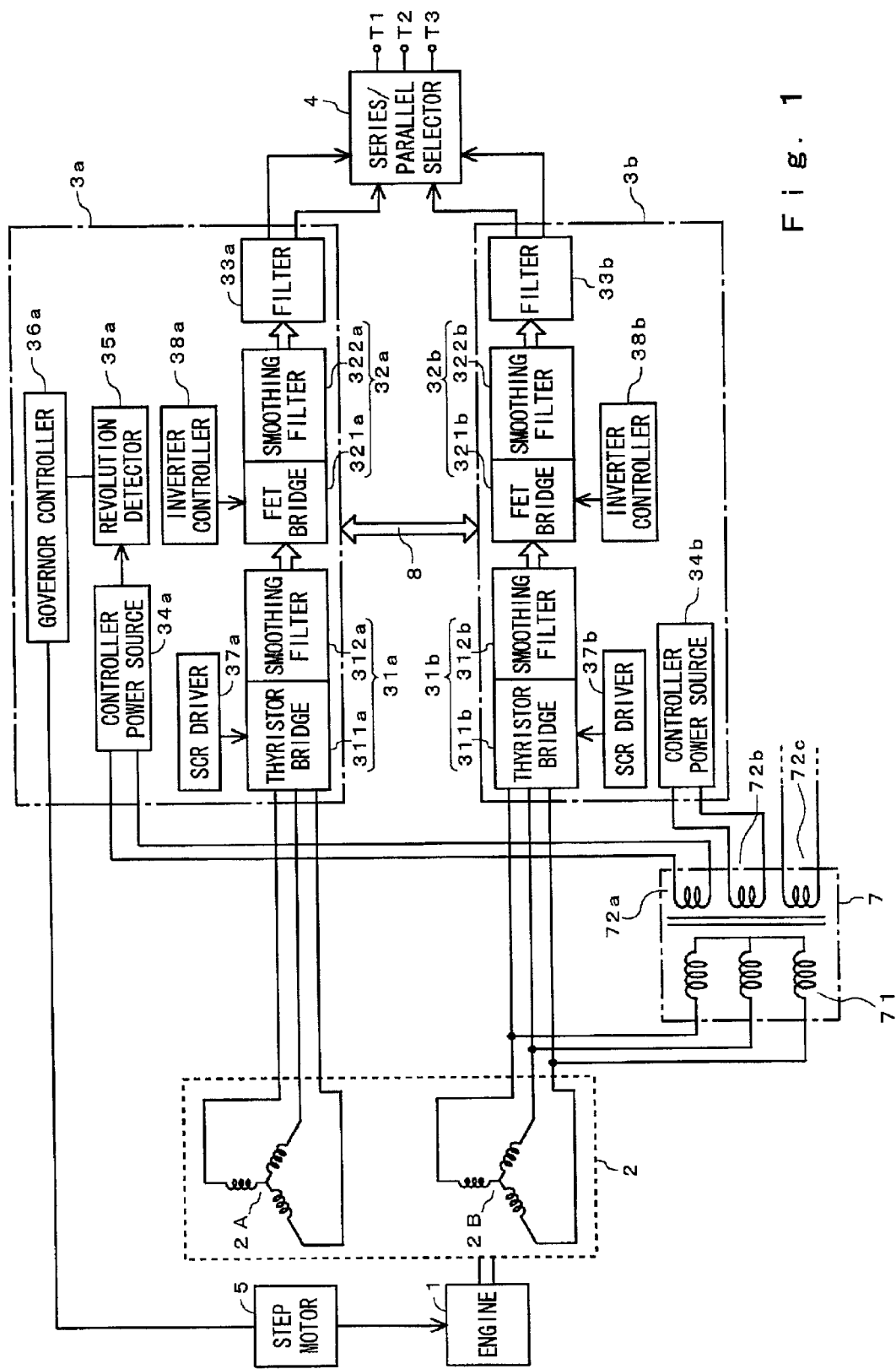
FIG. 1 is a block diagram of an arrangement of a multiplex connection inverter apparatus for use with an engine generator showing one embodiment of the present invention.

FIG. 1 is a block diagram of a primary part of a multiplex connection inverter apparatus for an engine generator showing one embodiment of the present invention.

A generator 2 has two three-phase main windings 2A and 2B and is driven by an engine 1. The output of the engine 1 is determined by the opening of a throttle (not shown) which is controlled by the action of a step motor 5. The main windings 2A and 2B are connected at the output end to a pair of inverter circuits 3a (a master) and 3b (a slave) respectively. The master 3a and the slave 3b are in turn connected at the output to a series/parallel selector 4. The series/parallel selector 4 connects in either series or parallel and superposes the two alternating current outputs of the master 3a and the slave 3b.

The output of the three-phase main winding 2B is connected to the primary coil 71 of a transformer 7. The secondary coil 72 of the transformer 7 is separated into three sub coils 72a, 72b and 72c.

The sub coils 72a and 72b serve as inverter power source coils for supplying a controller power source 34a for the master 3a and a controller power source 34b for the slave 3b with a driving power. The sub coil 72c acts as either a charging coil for supplying an internal battery (not shown) with a charging current or an external direct current coil for supplying an external socket (not shown) with a direct current voltage.

As described, a portion of the output of the generator 2 in this embodiment is used as an internal power source for, e.g. an inverter power supply or a battery charging power supply. Accordingly, the output of the generator 2 can be modified to a desired level used as the internal power source by simply determining the ratio of windings between the primary coil 71 and the secondary coil 72 of the transformer 7 for corresponding to a power requirement. As a result, the efficiency of the power generation will be improved.

Also, the secondary coil 72 of the transformer 7 is divided into the three sub coils 72a, 72b, and 72c in this embodiment. Accordingly, the output of the alternating current generator can be modified to a desired level used as the internal power source by controlling the number of windings of each sub coils to match the power consumption of electrical loads to be driven by the internal power source.

In the master 3a, the output of the three-phase main winding 2A is transmitted through a rectifier 31a, an inverter 32a, and a filter 33a and received by the series/parallel selector 4. The rectifier 31a comprises a thyristor bridge 311a and a smoothing filter 312a. The inverter 32a comprises an FET bridge 321a and a smoothing filter 322a.

An SCR driver 37a is provided for determining the angle of conduction of each thyristor in the thyristor bridge 311a. A revolution detector 35a detects the number of revolutions of the engine 1 from the alternating current output of the controller power source 34a. In response to the number of engine revolutions, a governor controller 36a then determines the action of the step motor 5. An inverter controller 38a supplies the inverter 32a with a PWM signal generated from the power requirement.

The arrangement of the slave 3b is identical to that of the master 3a except that the revolution detector 35a and the governor controller 36a are not provided and will be explained in no more detail. The two inverters 3a and 3b are connected to each other by a communications line 8 along which control signals and sync signals are transmitted for synchronizing operations.

Figure 2:
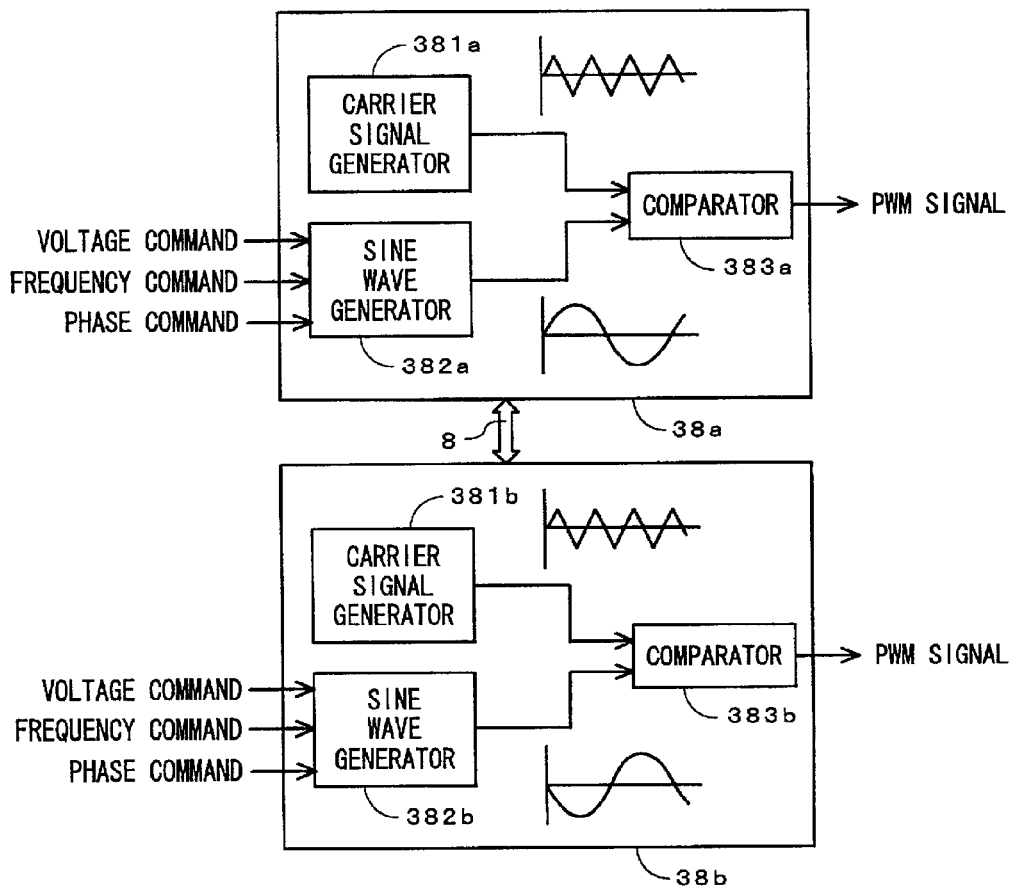
FIG. 2 is a block diagram of an arrangement of an inverter controller.

FIG. 2 is a block diagram showing an arrangement of the inverter controllers 38a and 38b provided in the master 3a and the slave 3b respectively.

The inverter controller 38a has a carrier signal generator 381a for generating a triangle signal as the carrier signal. A sine wave generator 382a is provided for generating and delivering a sine-wave signal in response to a voltage command, a frequency command, or a phase command. A comparator 383a compares between the carrier signal and the sine-wave signal to generate a PWM signal which is then released. The PWM signal is transmitted to the gate of each FET in the FET bridge 321a.

The arrangement of the inverter controller 38b is identical to that of the inverter controller 38a and will be explained in no more detail. As the two inverters 3a and 3b are connected to each other by the communications line 8 for exchanging sync signals, the sine-wave generators 382a and 382b are controlled with phase commands so that their respective sine-wave outputs are opposite in the phase to each other or 180 degrees out of phase with each other.

According to the above arrangement, even if two alternating current voltage outputs Va and Vb of the master 3a and the slave 3b respectively are out of phase with each other, their carrier signals are in phase with each other.

Figure 3:
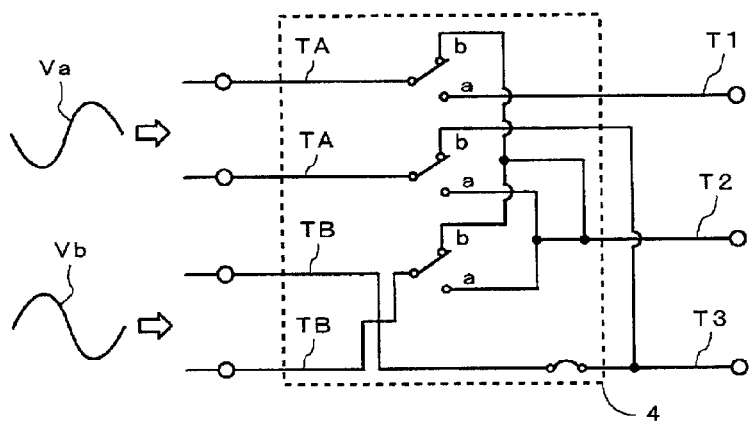
FIG. 3 is a circuitry diagram of a series/parallel selector.
Figure 4:
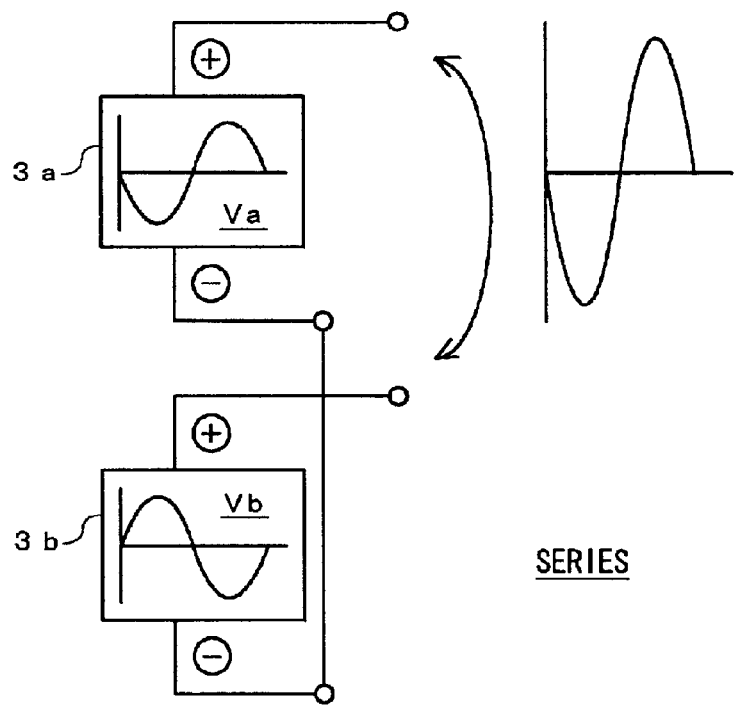
FIG. 4 is a diagram schematically showing a series connection function of the series/parallel selector.
Figure 5:
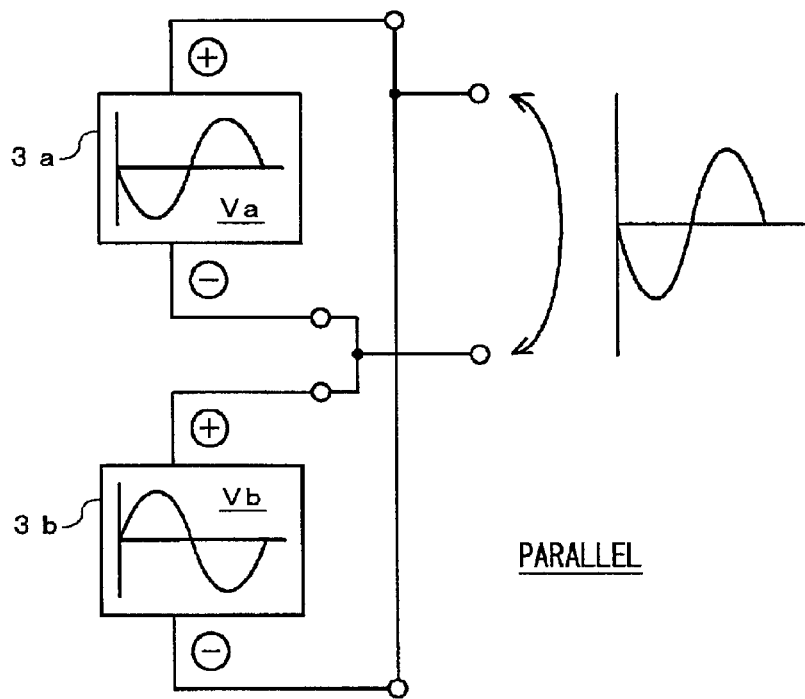
FIG. 5 is a diagram schematically showing a parallel connection function of the series/parallel selector.

The switching between series connection and parallel connection of the inverters will now be described. FIG. 3 is a circuitry diagram showing details of the series/parallel selector 4. FIGS. 4 and 5 are diagrams schematically showing functions of the same.

This embodiment allows the alternating current output Vb of the slave 3b to be inverted and then superposed in series with the alternating current output Va of the master 3a for series connection of the two alternating current outputs Va and Vb, as shown in FIG. 4. For parallel connection of the two alternating current outputs Va and Vb, the alternating current output Vb of the slave 3b is inverted and then superposed in parallel with the alternating current output Va of the master 3a.

Accordingly, while the two alternating current outputs Va and Vb are superposed in phase with each other, their carrier signal components are superposed in opposite phases and thus offset by each other as shown in FIG. 6. As a result shown in FIG. 7, the series/parallel selector 4 can release an alternating current output where undesired voltage ripples are successfully attenuated.

The series/parallel selector 4 may be implemented by a toggle switch. When the switch is connected at its contact a, the voltage output Va of the master 3a is received between two output terminals T1 and T2 and an inverted form of the voltage output Vb of the slave 3b is received between the output terminal T2 and an output terminal T3. Subsequently, the voltage between the two output terminals T1 and T3 is two times greater than the voltage output of the master 3a and the slave 3b. In other words, the master 3a and the slave 3b are connected in series.

When the switch is connected at its contact b, no voltage output is received between the output terminals T1 and T2 and both the voltage outputs of the master 3a and the slave 3b are received between the output terminal T2 and the output terminal T3. As a result, the voltage outputs of the master 3a and the slave 3b which are not phase shifted but doubled in the amplitude are received between the two output terminals T1 and T3. In other words, the master 3a and the slave 3b are connected in parallel.

According to the embodiment, the alternating current outputs Va and Vb of the master 3a and the slave 3b respectively are superposed in phase with each other while their carrier signal components are superposed in opposite phases and thus offset by each other. As a result, undesired voltage ripples in the alternating current outputs can successfully be attenuated.

The present invention allows the alternating current outputs of two different sources to be superposed while their carrier signal components are favorably offset by each other, thus minimizing undesired voltage ripples in its alternating output.

What is claimed is:

1. A multiplex connection inverter apparatus comprising:
   a first inverter generating a first alternating current output that includes a first carrier signal component,
   a second inverter generating a second alternating current output that includes a second carrier signal component, said first and said second alternating current outputs being synchronized together to be opposite in phase while the first and second carrier signal components are in phase, and
   a means for generating a third alternating current output, said means having one of two output terminals thereof arranged for connecting between a positive port of one of the two inverters and a negative port of the other inverter and the other output terminal thereof arranged for connecting between the negative port of the one inverter and the positive port of the other inverter,
   wherein, to generate the third alternating current output, said means superposes the first and second alternating current outputs such that the superposed first and second carrier signal components are opposite in phase.

2. A multiplex connection inverter apparatus comprising:
   a first inverter generating a first alternating current output that includes a first carrier signal component,
   a second inverter generating a second alternating current output that includes a second carrier signal component, said first and said second alternating current outputs being synchronized together to be opposite in phase while the first and second carrier signal components are in phase, and
   a means for generating a third alternating current output, said means being provided for connecting together the negative ports of the first and second inverters and for assigning the positive ports of the first and second inverters to be the output terminals,
   wherein, to generate the third alternating current output, said means superposes the first and second alternating current outputs such that the superposed first and second carrier signal components are opposite in phase.

* * * * *